United States Patent
Ikebata et al.

(10) Patent No.: US 11,286,323 B2
(45) Date of Patent: Mar. 29, 2022

(54) ADHESIVE COMPOSITION, ADHESIVE AGENT, ADHESIVE TAPE, AND AIRTIGHT WATERPROOF ADHESIVE TAPE

(71) Applicant: Mitsubishi Chemical Corporation, Tokyo (JP)

(72) Inventors: Akira Ikebata, Tokyo (JP); Toshifumi Akui, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 203 days.

(21) Appl. No.: 16/565,822

(22) Filed: Sep. 10, 2019

(65) Prior Publication Data

US 2020/0002579 A1 Jan. 2, 2020

Related U.S. Application Data

(63) Continuation of application No. PCT/JP2018/009169, filed on Mar. 9, 2018.

(30) Foreign Application Priority Data

Mar. 17, 2017 (JP) .............................. JP2017-052419

(51) Int. Cl.
C09J 7/38 (2018.01)
C08F 220/28 (2006.01)
C08F 220/18 (2006.01)

(52) U.S. Cl.
CPC .. C08F 220/1804 (2020.02); C08F 220/1808 (2020.02); C09J 7/385 (2018.01); C08F 220/1806 (2020.02); C08F 2800/20 (2013.01); C09J 2301/414 (2020.08); C09J 2433/00 (2013.01)

(58) Field of Classification Search
CPC .............................. C08F 220/283; C09J 7/385
See application file for complete search history.

(56) References Cited

U.S. PATENT DOCUMENTS 5,352,516 A * 10/1994 Therriault ............... A61L 15/58
428/355 CN
5,573,778 A 11/1996 Therriault et al.
10,660,503 B2 * 5/2020 Kakita ................ A47L 25/005

FOREIGN PATENT DOCUMENTS

| JP | 02-196879 | | 8/1990 |
|---|---|---|---|
| JP | 8-319464 | | 12/1996 |
| JP | H11-241053 | A | 9/1997 |
| JP | 09-328666 | | 12/1997 |
| JP | 10-182710 | | 7/1998 |
| JP | 10182710 | A * | 7/1998 |
| JP | 2008-127431 | | 6/2008 |
| JP | 2009-108314 | A | 5/2009 |
| JP | 2013-087214 | | 5/2013 |
| JP | 2014-040500 | | 3/2014 |
| JP | 2015-189782 | | 11/2015 |
| JP | 2016-102175 | A | 6/2016 |
| JP | 2017-179276 | | 10/2017 |

OTHER PUBLICATIONS

ISR issued in International Patent Application No. PCT/JP2018/009169, dated Apr. 24, 2018 (Eng Translation).
IPRP issued in Int'l. Patent Application No. PCT/JP2018/009169, dated Sep. 17, 2019 (Eng Translation).
Supplemental European Search Report issued in EP Patent App. No. 18766779.5 dated Feb. 18, 2020, English translations.
Office Action issued JP Patent Application No. 2018-513393, dated Sep. 28, 2021, English translation.

* cited by examiner

*Primary Examiner* — Vu A Nguyen
(74) *Attorney, Agent, or Firm* — Greenblum & Bernstein, P.L.C.

(57) ABSTRACT

An adhesive composition contains an acrylic resin (A) obtained by copolymerizing a copolymerization formulation (a), the copolymerization formulation (a) including predetermined proportions of: (a1) at least one selected from the group consisting of a (meth)acrylate having a C1 to C3 alkyl group, t-butyl (meth)acrylate, a cyclic structure-containing monomer, and a C3 to C10 vinyl ester monomer; (a2) a (meth)acrylate having a C4 to C24 alkyl group (excluding t-butyl (meth)acrylate); (a3) a terminal carboxyl-containing monomer having a specific structure; and (a4) (meth)acrylic acid. The adhesive composition provides firm adhesion to a higher-polarity adherend, a lower-polarity adherend, a poor-adhesion adherend such as of ethylene propylene diene rubber (EPDM), and a rough surface, and is excellent in holding force and adhesiveness in a high-temperature/high-humidity environment, with reduced susceptibility to deterioration in adhesiveness over time.

13 Claims, No Drawings

ADHESIVE COMPOSITION, ADHESIVE AGENT, ADHESIVE TAPE, AND AIRTIGHT WATERPROOF ADHESIVE TAPE

RELATED APPLICATION

This application is a continuation of International Application No. PCT/JP2018/009169, filed on Mar. 9, 2018, which claims priority to Japanese Patent Application No. 2017-052419, filed on Mar. 17, 2017, the entire contents of each of which being hereby incorporated by reference.

TECHNICAL FIELD

The present disclosure relates to an adhesive composition. More specifically, the present disclosure relates to an adhesive composition which has a higher adhesive strength to a higher polarity adherend, a lower polarity adherend, a poor adhesion adherend such as of ethylene propylene diene rubber (EPDM), and a rough adherend surface, and is excellent in holding force and adhesiveness even in a high temperature/high humidity environment, and less susceptible to deterioration in adhesiveness over time. The present disclosure further relates to an adhesive agent, an adhesive tape, and an airtight waterproof adhesive tape produced by using the adhesive composition.

BACKGROUND ART

Conventional adhesive agents and adhesive tapes produced by employing acrylic resins are used in a wide variety of applications, for example, for packaging tapes such as craft tapes, OPP (oriented polypropylene) tapes, and fabric adhesive tapes, light packaging adhesive cellophane tapes, temporary fixing tapes, automotive foam tapes, damping tapes, flame-retardant adhesive tapes, re-releasable double-sided tapes, housing protection tapes, soundproof seals, carpet fixing double-sided tapes, electrically insulative vinyl tapes, exterior corrosion-proof tapes, interior bulletin board tapes, slippage preventing tapes, masking tapes, surface protection tapes, airtight waterproof adhesive tapes, medical band aids and other patch bases, surgical tapes, adhesive bandages, electric/electronic device tapes, optical double-sided tapes, surface protection films, semiconductor device dicing tapes, heat conductive tapes, heat resistant tapes, electrically conductive tapes, and the like.

The acrylic resins to be used for the adhesive agents and the adhesive tapes are typically prepared by copolymerization of an alkyl (meth)acrylate as a major component. For improvement of adhesiveness to an adherend, an acrylic resin prepared by employing a carboxyl-containing monomer as a comonomer is also used.

For further improvement of the adhesiveness to the adherend, it is proposed to use an acrylic acid adduct having a specific structure as the carboxyl-containing monomer (see, for example, PTL 1 to PTL 3).

RELATED ART DOCUMENT

Patent Document

PTL 1: JP-A-HEI2 (1990)-196879
PTL 2: JP-A-2008-127431
PTL 3: JP-A-2014-40500

SUMMARY

In the art disclosed in PTL 1, the adhesive strength to the higher polarity adherend and the lower polarity adherend is improved by incorporating a greater proportion of the specific acrylic acid adduct as the comonomer. In PTL 1, however, a polypropylene adherend is used as the lower polarity adherend for the adhesive strength evaluation, but a polyethylene adherend for which the improvement of the adhesive strength is difficult is not used for the evaluation. Further, no consideration is given to the adhesive strength and the holding force with respect to a rough adherend surface. Therefore, the art disclosed in PTL 1 is not satisfactory.

The art disclosed in PTL 2 provides an adhesive composition containing an acrylic resin prepared by the copolymerization of the acrylic acid adduct and having an acid value of 1 to 50 mg KOH/g, a hydroxyl value of 10 to 60 mg KOH/g, and a number-average molecular weight of 50,000 to 500,000, and a polyisocyanate compound. It is stated that the adhesive composition is excellent in moist heat resistance, heat resistance, rework adhesive property, and long-lasting adherent/adhesive strength retaining property. More specifically, the proportion of the acrylic acid adduct is relatively small, i.e., 1 wt. % based on the weight of the copolymerization formulation, and this is insufficient for the improvement of the adhesive strength. In PTL 2, the adherend used for the adhesiveness evaluation of the adhesive composition is a glass substrate, but not an adherend having a rough surface.

The art disclosed in PTL 3 provides an adhesive composition containing; (A) an acrylic resin prepared by using an alkyl (meth)acrylate, a carboxyl-containing (meth)acrylic monomer, and a hydroxyl-containing (meth)acrylic monomer; (B) a solvent; and (C) a crosslinking agent; wherein the carboxyl-containing (meth)acrylic monomer includes a (meth)acrylic monomer having a (meth)acrylic acid group and 2 to 6 carbonyl groups. It is stated that an adhesive agent less susceptible to deterioration in adhesive strength and holding force even in a high temperature environment can be provided by using the adhesive composition. However, the adhesive composition is not evaluated for the adhesiveness to the lower polarity adherend, and no consideration is given to the adhesive strength and the holding force with respect to the rough surface. Therefore, the adhesive composition is not satisfactory.

As described above, the acrylic adhesive composition employing an acrylic resin is useful for an airtight waterproof adhesive tape. For energy saving by improving the airtight and heat-insulating properties of housing in response to the enforcement of a higher quality housing law for improvement of the quality of waterproof and airtight housing (housing excellent in waterproof and airtight properties), the airtight waterproof adhesive tape described above is used for sealing a gap between a housing structure and a housing part and a gap between housing parts (mainly for sealing a gap around a sash opening, a seam between overlap portions of moisture-permeable waterproof sheets, and the like) in airtight and/or waterproof applications. The airtight waterproof adhesive tape is required to firmly adhere to a higher polarity adherend such as an aluminum sash, a lower polarity adherend such as a moisture-permeable waterproof sheet, and a rough surface of an OSB (oriented strand board which is a woody board produced by laminating thin wood plies with the use of an adhesive agent in properly oriented relation and compressing the resulting laminate at a higher temperature). Further, the airtight waterproof adhesive tape is required to have a higher holding force so as to prevent displacement of the moisture-permeable waterproof sheet and the like fixed by the tape. The airtight waterproof adhesive tape is also required to be excellent in durability, particularly in adhesiveness even in the high temperature/high humidity environment, and to be substantially free from deterioration in adhesiveness over time.

The airtight waterproof adhesive tape is also used for a waterproof roofing polymer sheet material, for example, for airtight and waterproof sealing of a seam between sheets made of a poor adhesion material such as ethylene propylene diene rubber (EPDM), butyl rubber (IIR), chloroprene rubber (CR), polyvinyl chloride, chlorinated polyethylene, thermoplastic polyolefin rubber, or modified asphalt. For this application, an adhesive tape employing butyl rubber highly adhesive to the poor adhesion adherend and an adhesive tape employing asphalt are often used. However, the butyl rubber adhesive tape and the asphalt adhesive tape are poorer in durability, heat resistance, shear force resistance, and creep resistance (holding force) under certain stress. This problematically results in displacement of the sheets. On the other hand, a tape employing the conventional acrylic adhesive composition is rarely used because of its poor adhesiveness to the poor adhesion adherend such as the roofing polymer sheet material. However, there is a market demand for a tape employing an acrylic adhesive composition having adhesiveness comparable to that of the butyl rubber adhesive tape and the asphalt adhesive tape for application to the poor adhesion adherend such as the roofing polymer sheet material.

In view of the foregoing, the present disclosure provides an adhesive composition which ensures firm adhesion to a higher polarity adherend, a lower polarity adherend, a poor adhesion adherend such as of ethylene propylene diene rubber (EPDM), chloroprene rubber (CR), natural rubber (NR), styrene butadiene rubber (SBP), butyl rubber (IIR) or polyvinyl chloride, and a rough surface, and is excellent in holding force and adhesiveness even in a high temperature/high humidity environment, and less susceptible to deterioration in adhesiveness over time. Particularly, the present disclosure provides an adhesive composition useful for an airtight waterproof adhesive tape.

In view of the foregoing, the inventors conducted intensive studies and, as a result, found that, where the adhesive composition contains an acrylic resin, and the acrylic resin has a specific copolymerization formulation containing a specific terminal carboxyl-containing monomer and an alkyl (meth)acrylate, the adhesive composition ensures firm adhesion to the higher polarity adherend, the lower polarity adherend, the poor adhesion adherend such as of ethylene propylene diene rubber (EPDM), chloroprene rubber (CR), natural rubber (NR), styrene butadiene rubber (SBR), butyl rubber (IIR) or polyvinyl chloride, and the rough surface, and is excellent in holding force and adhesiveness even in the high temperature/high humidity environment and less susceptible to deterioration in adhesiveness over time.

The present disclosure relates to an adhesive composition containing an acrylic resin (A) prepared by copolymerizing a copolymerization formulation (a) including: (a1) 1 to 20 wt. % of at least one selected from the group consisting of a (meth)acrylate having a C1 to C3 alkyl group, t-butyl (meth)acrylate, a cyclic structure-containing monomer, and a C3 to C10 vinyl ester monomer; (a2) 55 to 97 wt. % of a (meth)acrylate, other than t-butyl (meth)acrylate, having a C4 to C24 alkyl group; (a3) 1 to 20 wt. % of a terminal carboxyl-containing monomer represented by the following general formula (1); and (a4) 0.1 to 5 wt. % of (meth)acrylic acid.

$$CH_2=CR^1-CO-O-(R^2-COO-)_nH \qquad (1)$$

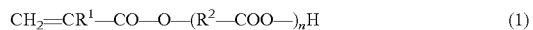

wherein $R^1$ is hydrogen or a methyl group, $R^2$ is a saturated aliphatic hydrocarbon, an unsaturated aliphatic hydrocarbon, an aromatic hydrocarbon, a saturated alicyclic hydrocarbon or an unsaturated divalent alicyclic hydrocarbon, and n is a positive number of not less than 1.

The present disclosure further relates to an adhesive agent, an adhesive tape, and an airtight waterproof adhesive tape produced by crosslinking the adhesive composition.

It is generally known that the adhesive strength can be improved by using the terminal carboxyl-containing monomer (a3) represented by the above general formula (1) for the copolymerization formulation of the adhesive composition, but the use of the terminal carboxyl-containing monomer (a3) is liable to reduce the holding force because of increase in distances between crosslinking points. This makes it difficult to satisfy the requirements for both the adhesiveness and the holding force. In the present disclosure, however, even if the terminal carboxyl-containing monomer (a3) is used for the copolymerization formulation, the adhesive composition prepared by using the aforementioned specific copolymerization formulation, i.e., by using the at least one (a1) selected from the group consisting of the (meth)acrylate having the C1 to C3 alkyl group, t-butyl (meth)acrylate, the cyclic structure-containing monomer, and the C3 to C10 vinyl ester monomer for the copolymerization, is excellent in adhesiveness without reduction in holding force.

According to the present disclosure, the adhesive composition contains the acrylic resin (A) prepared by copolymerizing the copolymerization formulation (a) including: (a1) 1 to 20 wt. % of the at least one selected from the group consisting of the (meth)acrylate having the C1 to C3 alkyl group, t-butyl (meth)acrylate, the cyclic structure-containing monomer, and the C3 to C10 vinyl ester monomer; (a2) 55 to 97 wt. % of the (meth)acrylate, other than t-butyl (meth) acrylate, having the C4 to C24 alkyl group; (a3) 1 to 20 wt. % of the terminal carboxyl-containing monomer represented by the following general formula (1); and (a4) 0.1 to 5 wt. % of (meth)acrylic acid.

$$CH_2=CR^1-CO-O-(R^2-COO-)_nH \qquad (1)$$

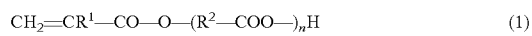

wherein $R^1$ is hydrogen or a methyl group, $R^2$ is a saturated aliphatic hydrocarbon, an unsaturated aliphatic hydrocarbon, an aromatic hydrocarbon, a saturated alicyclic hydrocarbon or an unsaturated divalent alicyclic hydrocarbon, and n is a positive number of not less than 1. Therefore, the adhesive composition is excellent in adhesiveness to a plastic adherend, a higher polarity adherend and a lower polarity adherend such as of metal and wood, a poor adhesion adherend such as of the EPDM, and a rough surface. Further, the adhesive composition is excellent in holding force and adhesiveness in the high temperature/high humidity environment, and is substantially free from deterioration in adhesiveness over time. Thus, the adhesive composition is excellent in moist heat resistance. Therefore, the adhesive composition is useful for various adhesive agents and adhesive tapes. Particularly, the adhesive composition is a promising material for an airtight waterproof adhesive tape to be used for housing and the like.

Where the (meth)acrylate (a2) having the C4 to C24 alkyl group includes: (a2-1) a (meth)acrylate having a C4 to C7 alkyl group; and (a2-2) a (meth)acrylate having a C8 to C24 alkyl group, the adhesive composition is more excellent in adhesiveness to the adherends.

Where a weight-based ratio between the proportion of the (meth)acrylate (a2-1) having the C4 to C7 alkyl group and the proportion of the (meth) acrylate (a2-2) having the C8 to C24 alkyl group is (a2-1)/(a2-2)=1/99 to 88/15, the adhesive composition is excellent in holding force as well as adhesiveness to the adherends.

Where the proportion of (meth)acrylic acid (a4) is 10 to 400 parts by weight based on 100 parts by weight of the terminal carboxyl-containing monomer (a3) represented by the above general formula (1), the adhesive composition is more excellent in adhesive strength and holding force.

Where the copolymerization formulation (a) further includes a hydroxyl-containing monomer (a5), the adhesive composition is still more excellent in adhesive strength and holding force.

An adhesive agent produced by crosslinking the adhesive composition is excellent in moist heat resistance.

DESCRIPTION OF EMBODIMENTS

The present disclosure will hereinafter be described in detail.

In the present disclosure, the term "(meth)acrylic" means acrylic or methacrylic, and the term "(meth)acryloyl" means acryloyl or methacryloyl. Further, the term "(meth) acrylate" means acrylate or methacrylate, and the term "acrylic resin" means a resin prepared by polymerizing a polymerization component including at least one (meth)acrylate monomer.

The adhesive composition of the present disclosure contains an acrylic resin (A) prepared by copolymerizing a copolymerization formulation (a) including specific proportions of specific monomers.

<Acrylic Resin (A)>

The acrylic resin (A) to be used in the present disclosure is prepared by copolymerizing a copolymerization formulation (a) including specific proportions of: (a1) at least one selected from the group consisting of a (meth) acrylate having a C1 to C3 alkyl group, t-butyl (meth)acrylate, a cyclic structure-containing monomer, and a C3 to C10 vinyl ester monomer; (a2) a (meth)acrylate, other than t-butyl (meth)acrylate, having a C4 to C24 alkyl group; (a3) a terminal carboxyl-containing monomer represented by a general formula (1) to be described later; and (a4) (meth) acrylic acid.

As required, the copolymerization formulation may include: (a5) a hydroxyl-containing monomer; and (a6) other polymerizable monomer. The components of the copolymerization formulation (a) will hereinafter be described in turn.

<Component (a1)>

The component (a1) is at least one selected from the group consisting of the (meth)acrylate having the C1 to C3 alkyl group, t-butyl (meth)acrylate, the cyclic structure-containing monomer, and the C3 to C10 vinyl ester monomer. Of these, the (meth)acrylate having the C1 to C3 alkyl group is preferred.

The proportion of the component (a1) is typically 1 to 20 wt. %, particularly preferably 1 to 18 wt. %, more preferably 2 to 15 wt. %, based on the total weight of the copolymerization formulation (a). If the proportion of the component, (a1) is excessively small, the holding force tends to be reduced. If the proportion of the component (a1) is excessively great, the adhesiveness to the lower polarity adherend tends to be reduced.

Examples of the (meth)acrylate having the C1 to C3 alkyl group include methyl (meth)acrylate, ethyl (meth)acrylate, and propyl (meth)acrylate. Of these, methyl (meth)acrylate and ethyl (meth)acrylate are preferred.

The cyclic structure-containing monomer is typically an acrylic monomer having a cyclic structure-containing substituent. Examples of the cyclic structure-containing monomer include: heterocyclic (meth)acrylates, such as N-(meth)acryloylmorpholine, N-vinylpyrrolidone, N-vinylcaprolactam, vinylpyrrolidone, N-(meth)acryloyl piperidine, and N-(meth)acryloyl pyrrolidine, which contain morpholine ring, piperidine ring, pyrrolidine ring, piperazine ring or other heteroring; and phenyl (meth)acrylate, phenoxyethyl (meth)acrylate, phenyl diethylene glycol (meth)acrylate, 2-hydroxy-3-phenoxypropyl (meth)acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth)acrylate, nonylphenoxy polyethylene glycol (meth)acrylate, isobonyl (meth)acrylate, and biphenyloxyethyl (meth)acrylate. Other examples of the cyclic structure-containing monomer include styrene and α-methylstyrene. Of these, a heterocyclic (meth)acrylate containing the morpholine ring is preferred because it has well-balanced physical properties. Particularly, N-(meth)acryloylmorpholine is preferred because of its easy availability and safety.

Examples of the C3 to C10 vinyl ester monomer include vinyl formate, vinyl acetate, vinyl propionate, vinyl valerate, vinyl butyrate, vinyl isobutyrate, and vinyl pivalate, among which vinyl acetate is preferred because of its easy availability.

<Component (a2)>

The component (a2) is a major component of the copolymerization formulation (a), and is the (meth)acrylate, other than t-butyl (meth)acrylate, having the C4 to C24 alkyl group, preferably a C4 to C12 alkyl group.

The proportion of the component (a2) is typically 55 to 97 wt. %, particularly preferably 70 to 95 wt. %, more preferably 80 to 90 wt. %, based on the total weight of the copolymerization formulation (a). If the proportion of the component (a2) is excessively small, the adhesiveness to the lower polarity adherend tends to be reduced. If the proportion of the component (a2) is excessively great, the adhesiveness and the holding force tend to be reduced.

It is preferred, from the viewpoint of the adhesiveness to the adherends, that the (meth)acrylate (a2) having the C4 to C24 alkyl group includes: (a2-1) a (meth)acrylate having a C4 to C7 alkyl group; and (a2-2) a (meth)acrylate having a C8 to C24 alkyl group.

A weight-based ratio between the proportion of the component (a2-1) and the proportion of the component (a2-2) is preferably (a2-1)/(a2-2)=1/99 to 85/15, particularly preferably 5/95 to 80/20, more preferably 10/90 to 70/30, especially preferably 15/35 to 40/60. If the proportion of the component (a2-1) is excessively small, the holding force tends to be reduced. If the proportion of the component (a2-1) is excessively great, the adhesiveness to the lower polarity adherend tends to be reduced.

Examples of the (meth)acrylate (a2-1) having the C4 to C7 alkyl group include n-butyl (meth)acrylate, isobutyl (meth) acrylate, and n-hexyl (meth)acrylate. Of these, n-butyl (meth)acrylate is preferred from the viewpoint of easy availability and economy.

Examples of the (meth)acrylate (a2-2) having the C8 to C24 alkyl group include 2-ethylhexyl (meth)acrylate, n-octyl (meth)acrylate, isooctyl (meth)acrylate, isononyl (meth)acrylate, isodecyl (meth)acrylate, lauryl (meth)acrylate, tridecyl (meth)acrylate, isotridecyl (meth)acrylate, myristyl (meth)acrylate, isomyristyl (meth)acrylate, cetyl (meth) acrylate, stearyl (meth)acrylate, isostearyl acrylate, and bebenyl (meth)acrylate. Of these, the (meth)acrylate having a C8 to C12 alkyl group is preferred because of its lower polarity and lower glass transition temperature, and 2-ethylhexyl (meth)acrylate is particularly preferred.

<Component (a3)>

The component (a3) is the terminal carboxyl-containing monomer represented by the following general formula (1):

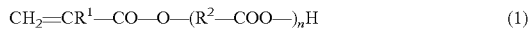

$$CH_2=CR^1-CO-O-(R^2-COO-)_nH \quad (1)$$

wherein $R^1$ is hydrogen or a methyl group, $R^2$ is a saturated aliphatic hydrocarbon, an unsaturated aliphatic hydrocarbon, an aromatic hydrocarbon, a saturated alicyclic hydrocarbon or an unsaturated divalent alicyclic hydrocarbon, and n is a positive number of not less than 1.

The substituent $R^2$ is preferably a C1 to C10 alkylene, more preferably a C1 to C5 alkylene (e.g., methylene), phenyl or phenylene, and n is preferably 1 to 10, more preferably 1 to 5.

The proportion of the component (a3) is typically 1 to 20 wt. %, particularly preferably 1.5 to 15 wt. %, more preferably 2 to 8.5 wt. %, based on the total weight of the copolymerization formulation (a). If the proportion of the component (a3) is excessively small, the adhesiveness to the adherends tends to be reduced. If the proportion of the component (a3) is excessively great, the adhesiveness to the lower polarity adherend tends to be reduced.

<Component (a4)>

The proportion of (meth) acrylic acid (a4) is typically 0.1 to 3 wt. %, particularly preferably 0.5 to 4.5 wt. %, more preferably 1 to 4 wt. %, based on the total weight of the copolymerization formulation (a). If the proportion of the component (a4) is excessively small, the adhesiveness to the adherends tends to be reduced. If the proportion of the component (a4) is excessively great, the adhesiveness to the lower polarity adherend tends to be reduced.

Based on 100 parts by weight of the component (a3), the proportion of the component (a4) is typically 10 to 400 parts by weight, particularly preferably 20 to 200 parts by weight, more preferably 25 to 100 parts by weight, especially preferably 30 to 75 parts by weight. If the proportion of the component (a4) is excessively small, the holding force tends to be reduced. If the proportion of the component (a4) is excessively great, the adhesiveness to the lower polarity adherend tends to be reduced.

<Component (a5)>

In the present disclosure, the acrylic resin (A) is prepared by copolymerizing the components (a1) to (a4), but desirably by copolymerizing the hydroxyl-containing monomer (a5) in addition to the components (a1) to (a4). Examples of the hydroxyl-containing monomer (a5) include: primary hydroxyl-containing monomers including hydroxyalkyl (meth)acrylates such as 2-hydroxyethyl (meth)acrylate, 4-hydroxybutyl (meth)acrylate, 5-hydroxypentyl (meth) acrylate, 6-hydroxyhexyl (meth)acrylate, and 8-hydroxyoctyl (meth)acrylate, caprolactone-modified monomers such as caprolactone-modified 2-hydroxyethyl (meth)acrylate, oxyalkylene-modified monomers such as diethylene glycol (meth)acrylate and polyethylene glycol (meth) acrylate, and 2-acryloyloxyethyl-2-hydroxyethyl phthalate; secondary hydroxyl-containing monomers such as 2-hydroxypropyl (meth)acrylate, 2-hydroxybutyl (meth)acrylate, and 3-chloro-2-hydroxypropyl (meth)acrylate; and tertiary hydroxyl-containing monomers such as 2,2-dimethyl-2-hydroxyethyl (meth)acrylate.

Of these, the primary hydroxyl-containing monomers are preferred, and 2-hydroxyethyl (meth)acrylate and 4-hydroxybutyl (meth)acrylate are particularly preferred because of their excellent reactivity with a crosslinking agent.

Where a crosslinking agent is blended in the adhesive composition, the hydroxyl-containing monomer (a5) is useful because it provides crosslinking points. Where an isocyanate crosslinking agent is used as the crosslinking agent, the hydroxyl-containing monomer (a5) is particularly effective. In this case, the proportion of the hydroxyl-containing monomer (a5) is typically 0.01 to 5 wt. %, particularly preferably 0.05 to 3 wt. %, more preferably 0.05 to 2 wt. %, based on the total weight of the copolymerization formulation (a). If the proportion of the component (a5) is excessively small, the holding force tends to be reduced. If the proportion of the component (a5) is excessively great, the adhesiveness to the adherends tends to be reduced.

<Other Polymerizable Monomer (a6)>

In the present disclosure, the other polymerizable monomer (a6) may be used as required. Examples of the other polymerizable monomer (a6) include functional group-containing monomers such as acetoacetyl-containing monomer, isocyanate-containing monomer, glycidyl-containing monomer, amino-containing monomer, amide-containing monomer, and other copolymerizable monomers.

Examples of the acetoacetyl-containing monomer include 2-(acetoacetoxy)ethyl (meth)acrylate and allyl acetoacetate.

Examples of the isocyanate-containing monomer include 2-acryloyloxyethyl isocyanate and 2-methacryloyloxyethyl isocyanate, and alkylene oxide adducts of these isocyanates.

Examples of the glycidyl-containing monomer include glycidyl (meth)acrylate and allylglycidyl (meth)acrylate.

The amino-containing monomer may be a monomer having an ethylenicaily unsaturated double bond and an amino group (unsubstituted or substituted amino group). Examples or the amino-containing monomer include: monosubstituted amino-containing (meth)acrylates including aminoalkyl (meth)acrylates such as aminomethyl (meth)acrylate, aminoethyl (meth)acrylate, aminopropyl (meth)acrylate, and aminoisopropyl (meth)acrylate, and N-alkylaminoalkyl (meth)acrylates such as N-(t-butyl)aminoethyl (meth)acrylate; disubstituted amino-containing (meth)acrylates including N,N-dialkylaminoalkyl (meth)acrylates such as N,N-dimethylaminoethyl (meth)acrylate, N,N-diethylaminoethyl (meth)acrylate, and N/N-dimethylaminopropyl (meth)acrylate; dialkylaminoalkyl (meth)acrylamides such as N,N-dimethylaminopropyl (meth)acrylamide, and quaternary salts of these amino-containing monomers; amino-containing styrenes such as p-aminostyrene; dialkylamino-containing styrenes such as 3-(dimethylamino)styrene and dimethylaminomethylstyrene; dialkylaminoalkyl vinyl ethers such as N,N-dimethylaminoethyl vinyl ether and N,N-diethylaminoethyl vinyl ether; and allylamine, 4-diisopropylamino-1-butene, trans-2-butene-1,4-diamine, and 2-vinyl-4,6-diamino-1,3,5-triazine.

The amide-containing monomer may be a monomer having an ethylenically unsaturated double bond and an amide group (amide bond-containing group). Examples of the amide-containing monomer include: (meth)acrylamide; N-alkyl(meth)acrylamides such as N-methyl (meth)acrylamide, N-ethyl(meth)acrylamide, N-propyl(meth)acrylamide, N-isopropyl(meth)acrylamide, N-n-butyl-meth)acrylamide, N-isobutyl(meth)acrylamide, N-s-butyl(meth) acrylamide, N-t-butyl(meth)acrylamide, N-hexyl(meth) acrylamide, diacetone (meth)acrylamide, N,N'-methylenebis(meth)acrylamide, and N-(1,1-dimethyl-3-oxobutyl) (meth) acrylamide; N,N-dialkyl(meth) acrylamides such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth) acrylamide, N,N-diisobutyl(meth)acrylamide, N,N-di(s- butyl)(meth)acrylamide, N,N-di(t-butyl)(meth)acrylamide, N,N-dipentyl(meth)acrylamide, N,N-dihexyl(meth)acrylamide, N,N-diheptyl(meth)acrylamide, N,N-dioctyl(meth)acrylamide, N,N-diallyl(meth)acrylamide, and N,N-ethylmethylacrylamide; dialkylaminoalkyl(meth)acrylamides such as N,N-dimethylaminopropyl(meth)acrylamide; substituted amide-containing monomers such as N-vinylacetamide, N-vinylformamide, (meth)acrylamidoethylethylene urea, and (meth)acrylamido-t-butyl sulfonate; hydroxyl-containing (meth)acrylamides such as N-methylol(meth)acrylamide, N-hydroxyethyl(meth)acrylamide, and N-methylolpropane(meth)acrylamide; alkoxy-containing (meth)acrylamides such as N-methoxymethyl(meth)acrylamide and N-(n-butoxymethyl)(meth)acrylamide; and quaternary salts of these amide-containing monomers.

Examples of the other copolymerizable monomer include: alkoxy- or oxyalkylene-containing monomers such as 2-methoxyethyl (meth)acrylate, 2-ethoxyethyl (meth)acrylate, methoxydiethylene glycol (meth)acrylate, ethoxydiethylene glycol (meth)acrylate, methoxypolyethylene glycol (meth)acrylate, and polypropylene glycol mono(meth)acrylate; and acrylonitrile, methacrylonitrile, vinyl stearate, vinyl chloride, vinylidene chloride, alkyl vinyl ethers, vinyltoluene, dialkyl itaconates, dialkyl fumarates, allyl alcohol, acryl chloride, methyl vinyl ketone, allyltrimethylammonium chloride, and dimethylallyl vinyl ketone.

In order to control the physical properties of the adhesive composition according to the use application, the other polymerizable monomer (a6) is used in a proportion that does not impair the effects of the present disclosure.

The acrylic resin (A) is prepared by polymerizing the components (a1) to (a4) and the optional components (a5) and (a6) of the copolymerization formulation. The aforementioned monomers for each of the components (a1) to (a6) may be used alone or in combination.

A solution polymerization method is preferably used for the polymerization, so that the acrylic resin (A) can be safely and stably prepared as having a desired monomer formulation.

In a typical solution polymerization method, a polymerization initiator, the copolymerization formulation (a) including the components (a1) to (a4), and the like are mixed with or added dropwise to an organic solvent, and the polymerization is allowed to proceed at 50° C. to 98° C. for 1 to 20 hours under reflux.

An ordinary radical polymerization initiator may be used as the polymerization initiator. Specific examples of the radical polymerization initiator include azo polymerization initiators such as azobisisobutyronitzile and azobisdimethyivaleronitrile, and peroxide polymerization initiators such as benzoyl peroxide, lauroyl peroxide, di-t-butyl peroxide, and cumene hydroperoxide, which may be used alone or in combination.

The acrylic resin (A) thus prepared typically has a weight-average molecular weight of 100,000 to 5,000,000, preferably 300,000 to 1,500,000, particularly preferably 500,000 to 500,000. If the weight-average molecular weight is excessively low, the durability tends to be reduced. If the weight-average molecular weight is excessively high, the preparation tends to be difficult.

The dispersity ratio (weight-average molecular weight/number-average molecular weight) of the acrylic resin (A), which is determined based on the weight-average molecular weight and the number-average molecular weight, is preferably not higher than 20, particularly preferably not higher than 15, more preferably not higher than 10, especially preferably not higher than 7. If the dispersity ratio is excessively high, an adhesive agent layer formed from the adhesive composition tends to be poorer in durability and suffer from foaming. The lower limit of the dispersity ratio is typically 1.1 due to the limitation in the preparation of the acrylic resin.

The weight-average molecular weight of the acrylic resin (A) is based on standard polystyrene molecular weight, and is determined by high-performance liquid chromatography (Waters 2695 (apparatus main body) and Waters 2414 (detector) available from Nihon Waters K.K.) with the use of three columns Shodex GPC KF-806L (each having an exclusion limit molecular weight of $2 \times 10^7$, a separation range of 100 to $2 \times 10^7$, a theoretical plate number of 10,000 per column, and filled with a column packing material of styrene-divinylbenzene copolymer having a particle diameter of 10 μm) connected in series. The number-average molecular weight may be determined by the same method.

Further, the acrylic resin (A) preferably has a glass transition temperature (Tg) of −80° C. to 10° C., particularly preferably −70° C. to −10° C., more preferably −65° C. to −20° C. If the glass transition temperature is excessively high, the tackiness tends to be insufficient. If the glass transition temperature is excessively low, the heat resistance tends to be reduced.

The glass transition temperature is calculated by putting the glass transition temperatures of homopolymers of the respective monomers of the acrylic resin (A) and the weight fractions of the respective monomers into the following Fox equation:

$$\frac{1}{Tg} = \frac{Wa}{Tga} + \frac{Wb}{Tgb} + \ldots + \frac{Wn}{Tgn}$$

Tg: The glass transition temperature (K) of the acrylic resin (A)
Tga: The glass transition temperature (K) of a homopolymer of a monomer A
Wa: The weight fraction of the monomer A
Tgb: The glass transition temperature (K) of a homopolymer of a monomer B
Wb: The weight fraction of the monomer B
Tgn: The glass transition temperature (K) of a homopolymer of a monomer N
Wn: The weight fraction of the monomer N ($Wa+Wb+\ldots+Wn=1$)

The glass transition temperatures of the homopolymers of the monomers of the acrylic resin (A) are typically measured in conformity with JIS K7121-1987 and JIS K6240 by means of a differential scanning calorimeter (DSC), or values shown in catalogs are used.

The viscosity of the acrylic resin (A) is controlled with the use of a solvent or the like, and the resulting solution of the acrylic resin (A) is used for coating. The viscosity of the solution of the acrylic resin (A) is preferably 500 to 20,000 mPa·s, particularly preferably 1,000 to 18,000 mPa·s, more preferably 2,000 to 15,000 mPa·s. If the viscosity is excessively high, the fluidity of the solution tends to be reduced, resulting in difficult handling. If the viscosity is excessively low, the coating with the adhesive agent tends to be difficult.

The viscosity of the solution of the acrylic resin (A) is measured in conformity with "4.5.3 Rotational Viscometer Method" of JIS K5400 (1990).

<Crosslinking Agent (B)>

The adhesive composition of the present disclosure preferably contains a crosslinking agent (B) in addition to the acrylic resin (A) for adhesiveness.

The crosslinking agent (B) reacts with functional groups of the acrylic resin (A) to form a crosslinking structure. Examples of the crosslinking agent (B) include epoxy crosslinking agent, isocyanate crosslinking agent, aziridine crosslinking agent, melamine crosslinking agent, aldehyde crosslinking agent, amine crosslinking agent, and metal chelate crosslinking agent. Of these, the epoxy crosslinking agent is preferred for proper balance between the adhesiveness to the adherends and the holding force. Further, the isocyanate crosslinking agent is preferred for long-lasting stability of the adhesive tape even in the high temperature/high humidity environment, and for excellent adhesiveness and excellent moist heat resistance.

Examples of the epoxy crosslinking agent include 1,3-bis(N,N'-diglycidylaminomethyl)cyclohexane, N,N,N',N'-tetraglycidyl-m-xylylenediamine, ethylene glycol diglycidyl ether, 1,6-hexanediol diglycidyl ether, trimethylolpropane diglycidyl ether, diglycidylaniline, and diglycidylamine. Of these, 1,3-bis(N,N'-diglycidylaminomethyl)cyclohexane is preferred.

The isocyanate crosslinking agent contains at least two isocyanate groups. Examples of the isocyanate crosslinking agent include: aromatic polyisocyanates such as tolylene diisocyanate, diphenylmethane diisocyanate, and zylylene diisocyanate; aliphatic polyisocyanates such as hexamethylene diisocyanate; alicyclic polyisocyanates such as isophorone diisocyanate, and hydrogenated diphenylmethane diisocyanate; and a biuret form or a cyanurate form of any of these compounds, and an adduct form of any of these compounds which is a product of a reaction with a lower-molecular-weight active hydrogen-containing compound such as ethylene glycol, propylene glycol, neopentyl glycol, trimethylolpropane, and castor oil. Of these, the aromatic polyisocyanates, and adduces of the aromatic polyisocyanates with trimethylolpropane are preferred, and an adduct of tolylene diisocyanate with trimethylolpropane is particularly preferred.

Examples of the aziridine crosslinking agent include diphenylmethane-4,4'-bis(1-aziridinecarboxide), trimethylolpropane-tri-β-aziridinyl propionate, tetramethylolmethane-tri-β-aziridinyl propionate, toluene-2,4-bis(1-aziridinecarboxide), triethylenemelamine, bisisophthaloyl-1-(2-methylaziridine), tris-1-(2-methylaziridine) phosphine, and trimethylolpropane-tri-β-(2-methylaziridine) propionate.

Examples of the melamine crosslinking agent include: melamine; methylol melamine derivatives such as amino-containing methylol melamine prepared by condensation of melamine and formaldehyde, imino-containing methylol melamine, and hexamethylol melamine; and alkylated methylol melamines such as partially- or fully-alkylated methylol melamines prepared by allowing the methylol melamine derivatives to react with a lower alcohol such as methyl alcohol or butyl alcohol for partial or full etherization, and partially- or fully-alkylated imino-containing methylol melamines.

Examples of the aldehyde crosslinking agent, include: formaldehyde, acetaldehyde, propionaldehyde, butyraldehyde, glyoxal, glutaric aldehyde, dialdehyde starch; aldehyde compounds, such as hexamethylene tetramine, 1,4-dioxane-2,3-diol, 1,3-bis(hydroxymethyl)-2-imidazoline, dimethylol urea, N-methylolacrylamide, urea formalin resins, and melamine formalin resins, from which aldehydes are liberated in aqueous solutions; and aromatic aldehyde compounds such as benzaldehyde, 2-methylbenzaldehyde, 4-methylbenzaidehyde, p-hydroxybenzaldehyde, and m-hydroxybenzaldehyde.

Examples of the amine crosslinking agent include 4,4'-methylene-bis(2-chloroaniline) (hereinafter abbreviated as "MOCA"), modified MOCA, and diethyltoluenediamine.

Examples of the metal chelate crosslinking agent include chelates containing aluminum, zirconium, titanium, zinc, iron or tin as a metal atom. An aluminum chelate is preferred for performance. Examples of the aluminum chelate include diisopropoxyaluminum monooleyl acetoacetate, monoisopropoxyaluminum bisoleyl acetoacetate, monoisopropoxyaluminum monooleate monoethyl acetoacetate, diisopropoxyaluminum monolauryl acetoacetate, diisopropoxyaluminum monostearyl acetoacetate, and diisopropoxyaluminum monoisostearyl acetoacetate.

The aforementioned crosslinking agents (B) may be used alone or in combination.

The proportion of the crosslinking agent (B) is typically 0.01 to 5 parts by weight, particularly preferably 0.01 to 4 parts by weight, more preferably 0.02 to 3 parts by weight, based on 100 parts by weight of the acrylic resin (A). If the proportion of the crosslinking agent is excessively small, the holding force tends to be reduced. If the proportion of the crosslinking agent is excessively great, the adhesiveness to the adherends tends to be reduced.

Of the aforementioned crosslinking agents (B), the epoxy crosslinking agent is preferably used for ensuring proper balance between the adhesiveness to the adherends and the holding force. The proportion of the epoxy crosslinking agent is typically 0.01 to 0.1 part by weight, particularly preferably 0.01 to 0.08 parts by weight, more preferably 0.02 to 0.05 parts by weight, based on 100 parts by weight of the acrylic resin (A). If the proportion of the epoxy crosslinking agent is excessively small, the holding force tends to be reduced. If the proportion of the epoxy crosslinking agent is excessively great, the adhesiveness to the adherends tends to be reduced.

Of the aforementioned crosslinking agents (B), the isocyanate crosslinking agent is preferably used for ensuring firm bonding and higher durability. The proportion of the isocyanate crosslinking agent is typically 0.1 to 5 parts by weight, particularly preferably 0.1 to 1 part by weight, more preferably 0.3 to 0.9 parts by weight, based on 100 parts by weight of the acrylic resin (A). If the proportion of the isocyanate crosslinking agent is excessively small, the holding force tends to be reduced. If the proportion of the isocyanate crosslinking agent is excessively great, the adhesiveness to the lower polarity adherend tends to be reduced.

<Tackifier (C)>

A tackifier (C), which imparts the acrylic resin (A) with excellent physical properties, is preferably contained in the adhesive composition of the present disclosure. The tackifier (C) may be a resin compatible with the acrylic resin (A), and examples of the tackifier (C) include rosin resin, terpene resin, xylene resin, phenol resin, coumarone resin, and petroleum resin, which may be used alone or in combination.

Where the adhesive composition of the present disclosure is used for an adhesive agent for an airtight waterproof adhesive tape, the rosin resin, the terpene resin, and the petroleum resin are preferred, and the rosin resin is more preferred because of its well-balanced physical properties.

Examples of the rosin resin include rosin ester resins prepared by esterifying a hydrogenation product, a disproportionation product, a dimerization product or an acid addition product of a raw material rosin with the use of glycerin or pentaerythritol, and rosin phenol resins prepared by addition of phenol to a raw material rosin. With the use of any of these rosin resins, the acrylic resin (A) can be imparted with more excellent physical properties. Particularly, a disproportionate rosin ester prepared by esterifying the disproportionation product of the raw material rosin with glycerin or pentaerythritol and having a softening point of 70° C. to 130° C., a polymerized rosin ester prepared by esterifying the dimerization product of the raw material rosin with pentaerythritol and having a softening point of 110° C. to 170° C., and a rosin phenol prepared by adding phenol to a raw material rosin and having a softening point of 120° C. to 160° C. are preferred.

The terpene resin is a generic term for compounds represented by a molecular formula $(C_5H_6)_n$ according to the isoprene rule. Examples of the terpene resin to be used as the tackifier (C) in the present disclosure include resins prepared by homopolymerizing or copolymerizing nonoterpenes (e.g., α-pinene, β-pinene, limonene, and the like) with the use of a Friedel-crafts catalyst. Specific examples of the resins prepared by the homopolymerization or the copolymerization of the monoterpenes include α-pinene resin, β-pinene resin, dipentene resin, terpene phenol resin, aromatic modified terpene resin, and hydrogenated terpene resins prepared by hydrogenating these resins. Of these, the terpene phenol resin is preferred because of its compatibility with the acrylic resin (A). The terpene phenol resin imparts the acrylic resin (A) with more excellent physical properties. Particularly, the terpene phenol resin preferably has a softening point of 90° C. to 170° C. and a hydroxyl value of 20 to 250 (mg KOH/g), more preferably a softening point of 100° C. to 150° C. and a hydroxyl value of 50 to 150 (mg KOH/g).

Examples of the petroleum resin include purified monomer resin, aliphatic C5 petroleum resin, aromatic C9 petroleum resin, and hydrogenated petroleum resin, which are prepared by polymerizing C4- to C5- and C9- to C11- fraction monomers generated by thermal decomposition of naphtha and the like and then hydrogenating the resulting polymer, and classified according to the type of the raw material fraction. The petroleum resin imparts the acrylic resin (A) with more excellent physical properties. Particularly, the petroleum resin preferably has a softening point of 90° C. to 130° C. More preferably, the petroleum resin is a resin prepared by copolymerization of a styrene monomer and an aliphatic monomer.

The proportion of the tackifier (C) to be blended is properly set according to the physical property requirements, and is typically 1 to 50 parts by weight, particularly preferably 5 to 30 parts by weight, more preferably 5 to 20 parts by weight, based on 100 parts by weight of the acrylic resin (A).

The adhesive composition of the present disclosure may contain some other component, as long as the effects of the present disclosure are not impaired. Examples of the other component include a resin component other than the acrylic resin (A), acryl monomer, additives such as polymerization inhibitor, antioxidant, corrosion inhibitor, crosslinking accelerating agent, radical generator, peroxide, radical scavenger, UV absorber, plasticizer, pigment, stabilizer, filler, and flame retardant, and metal particles and resin particles. The adhesive composition may slightly contain impurities and the like attributable to the ingredients of the components of the adhesive composition.

The proportion of the other component is preferably not greater than 5 parts by weight, particularly preferably not greater than 1 part by weight, more preferably not greater than 0.5 parts by weight, based on 100 parts by weight of the acrylic resin (A). If the proportion of the other component is excessively great, the compatibility with the acrylic resin (A) and the durability tend to be reduced. If sufficient effects cannot be provided by adding the pigment, the filler, the flame retardant, the metal particles, the resin particles, and the like in the aforementioned proportions, the proportions of these additives may be properly adjusted so as to ensure the effects of the additives without impairing the effects of the present disclosure.

As described above, the adhesive composition of the present disclosure contains the acrylic resin (A) and, as required, the crosslinking agent (B), the tackifier (C), and the other optional component.

The adhesive composition is prepared by mixing the aforementioned components. An adhesive agent of the present disclosure is produced by crosslinking the adhesive composition. The adhesive agent is advantageously used for an adhesive agent layer of an adhesive tape of the present disclosure.

<Adhesive Tape>

The adhesive tape of the present disclosure includes an adhesive agent layer formed from the adhesive agent produced by crosslinking (curing) the adhesive composition. More specifically, the adhesive composition is dissolved in a solvent such as ethyl acetate to a solid concentration of 10 to 70%, whereby an adhesive composition solution is prepared for coating. The solution is applied onto a substrate, and dried. Thus, the adhesive agent layer of the adhesive tape is produced.

A generally known adhesive tape production method may be used for the production of the adhesive tape. Examples of the production method include: a method including the steps of applying the adhesive agent on one surface of a substrate, drying the adhesive agent, and superposing a release liner on a surface of the resulting adhesive agent layer; and a method including the steps of applying the adhesive agent on one surface of a release liner, and superposing a substrate on a surface of the resulting adhesive agent layer. Particularly, the method including the steps of applying the adhesive agent on one surface of a release liner, and superposing a substrate or a surface of the resulting adhesive agent layer is preferred for handing.

The substrate is preferably a hand-tearable substrate. The surface of the hand-tearable substrate may be subjected to a commonly known surface treatment, e.g., a physical treatment such as corona discharge treatment or plasma treatment, or a chemical treatment such as priming treatment, as required.

The substrate may be a conventionally known substrate, but is not particularly limited. Examples of the substrate include rayon fabrics, cotton fabrics, polyester fabrics, fabrics of rayon/polyester blended yarns, nonwoven fabrics, flat yarn cloths, and laminate films including a flat yarn cloth laminated with a plastic film. Of these, the flat yarn cloth-containing substrates are preferred because of their high longitudinal tensile strength.

The flat yarn cloths are woven fabrics each produced by weaving so-called flat yarns prepared by cutting a polyethylene or polypropylene film into strips and stretching the strips to strengthen the yarns. Warp flat yarns and weft flat yarns of such a woven fabric to be used are fusion-bonded at intersections thereof for prevention of misalignment thereof.

Examples of the release liner include: plastic films made or plastics such as polyolefin resin (e.g., polyethylene), polyester resin (e.g., polyethylene terephthalate), vinyl acetate resin, polyimide resin, fluororesin, and cellophane; paper such as Kraft paper and Japanese paper; rubber sheets such as made of natural rubber and butyl rubber; foam sheets such as obtained by foaming polyurethane and polychloroprene rubber; metal foils such as aluminum foil and copper foil; and composite materials prepared from any of these materials. These release liners may be each subjected to a surface treatment such as corona treatment, which is performed on one or both of the surfaces of the release liner.

Other examples of the release liner include: laminated paper sheets prepared by laminating glassine paper, Kraft paper or clay-coated paper with a film of polyethylene or the like; paper sheets coated with a resin such as polyvinyl alcohol or acrylic acid ester copolymer; and synthetic resin films such as polyester film and polypropylene film coated with a release agent such as fluororesin or silicone resin.

Of these, the paper release liner is preferred because of its easy hand tearability. Particularly, the paper release liner preferably has a paper weight of 40 to 120 g/m², more preferably 50 to 80 g/m². Further, the release liner preferably has a thickness of 40 to 180 μm, particularly preferably 60 to 140 μm, more preferably 80 to 120 μm. If the thickness of the release liner is excessively small, the release liner is liable to be wrinkled during the winding thereof, making the production thereof difficult. If the thickness of the release liner is excessively great, the adhesive tape tends to be poorer in hand tearability.

A common coating applicator may be used for applying the adhesive agent onto one surface of the substrate or the release liner. Examples of the coating applicator include knife-on-roll coater, die coater, roll coater, bar coater, gravure roll coater, reverse roll coater, dipping device, and blade coater.

The adhesive agent layer preferably has 5 to 200 μm, particularly preferably 10 to 150 μm, more preferably 15 to 130 μm, after being dried.

If the thickness of the adhesive agent layer is excessively great, the application of the adhesive agent tends to be difficult. If the thickness of the adhesive agent layer is excessively small, it will be impossible to provide a sufficient adhesive strength.

The adhesive tape of the present disclosure may be a single-sided adhesive tape, or may be a double-sided adhesive tape. The double-sided adhesive tape may have adhesive agent layers having the same formulation or different formulations.

Where release liners are respectively provided on the adhesive agent layers of the double-sided adhesive tape, the release liners on the opposite sides of the double-sided adhesive tape are preferably selected so as to differ in peel strength for improvement of working efficiency. For example, the release liners are selected so that one of the release liners present on a side of the double-sided adhesive tape to be first attached to an adherend has a lower peel strength than the other release liner present on a side of the double-sided adhesive tape to be next attached to another adherend. Thus, the working efficiency is improved.

Conditions for the drying may be such that a solvent and residual monomers present in the adhesive agent can be dried off and, where the crosslinking agent is used, the functional groups of the base resin can react with the crosslinking agent to form a crosslinked structure. For example, the drying conditions preferably include a drying temperature of 60° C. to 120° C. and a drying period of about 1 to about 5 minutes. After the drying, the cross linking reaction may be allowed to further proceed by keeping the adhesive agent layers between sheet substrates to maturity (for aging).

The adhesive tape of the present disclosure may be in a roll form or in a sheet form, or may be processed into other various shapes.

Where the adhesive tape is the double-sided adhesive tape of the sheet form, it is preferred to respectively provide release liners on opposite surfaces of the two adhesive agent layers. Where the adhesive tape is the double-sided adhesive tape of the roll form, it is preferred to provide a release liner on a surface of only one of the two adhesive agent layers.

Thus, the adhesive tape of the present disclosure is produced. The adhesive tape of the present disclosure is free from degradation in adhesive properties with respect to a poor adhesion adherend or substrate, and has excellent adhesive properties even under moist heat conditions. Where the hand-tearable substrate is used as the substrate film, the adhesive tape can be easily cut in the tape transverse direction at any desired position by hand without the use of a tape cutter or the like and, hence, is particularly useful.

The adhesive agent layer of the adhesive tape has a 180-degree peel strength of 1 to 100 N/25 mm with respect to an ordinary adherend as measured in conformity with JIS Z0237.

Where a test plate of SUS304 steel is used as a higher polarity adherend, the adhesive tape preferably has a 180-degree peel strength of not less than 25 N/25 mm, particularly preferably not less than 30 N/25 mm, more preferably not less than 35 N/25 mm, as measured in conformity with JIS Z0237. The upper limit of the 180-degree peel strength with respect to the higher polarity adherend is typically about 100 N/25 mm.

Where a test plate of polyethylene is used as a lower polarity adherend, the adhesive tape preferably has a 180-degree peel strength of not less than 3 N/25 mm, particularly preferably not less than 5 N/25 mm, more preferably not less than 10 N/25 mm, as measured in conformity with JIS Z0237. The upper limit of the 180-degree peel strength with respect to the lower polarity adherend is typically about 100 N/25 mm.

Where a test plate of OSB is used as a rough surface adherend, the adhesive tape preferably has a 90-degree peel strength of not less than 3 M/25 mm, particularly preferably not less than 5 N/25 mm, more preferably not less than 6 N/25 mm, as measured in conformity with JIS Z0237. The upper limit of the 90-degree peel strength with respect to the rough surface adherend is typically about 50 N/25 mm.

Where a test plate of EPDM is used as a poor adhesion adherend, the adhesive tape preferably has a 180-degree peel strength of not less than 10 N/25 mm, particularly preferably not less than 15 M/25 mm, more preferably not less than 20 N/25 mm, as measured in conformity with JIS Z0237. The upper limit of the 180-degree peel strength with respect to the poor adhesion adherend is typically about 100 N/25 mm.

The adhesive strength is liable to vary depending upon the formulation (material quality) and the surface state (surface roughness) of the adherend, and the conditions for treating (cleaning) the adherend and, therefore, is not limited to the peel strength ranges described above.

The adhesive strength is measured in conformity with JIS Z0237, more specifically, by methods to be described later in EXAMPLES.

Where the double-sided adhesive tape is used as a test sample, an adhesive surface not to be subjected to the Lest is covered with a polyethylene terephthalate film (LUMIR- ROR S10 available from Toray Industries, Inc.) having a nominal thickness of 25 μm specified in JIS C2318 for the measurement.

The adhesive agent layer is evaluated for the holding force based on measurement by a method to be described later in EXAMPLES. In this case, it is preferred that, even if the test sample is displaced from the test plate after a lapse of 24 hours, the displacement of the test sample is not greater than 3.0 mm, and that, even if the test sample falls within 24 hours, the retention time of the test sample is not shorter than 150 minutes.

The adhesive agent layer is evaluated for the moist heat resistance based on measurement by a method to be describe later in EXAMPLES. More specifically, the evaluation is based on measurement in which a procedure "After the press-bonding, the resulting test strip is allowed to stand for 30 minutes, then is exposed to a 60° C. and 90% RH environment for 7 days, and allowed to stand in a 23° C. and 50% RH environment for 1 hour" is employed instead of a procedure "After the press-bonding, the resulting test strip is allowed to stand for 24 hours" in a test for adhesiveness evaluation (1) using a SUS304 steel test plate as an adherend. In this case, the adhesive tape is preferably substantially free from reduction in adhesive strength and, even if suffering from the reduction in adhesive strength, preferably has an adhesive strength that is not less than 65% of the initial adhesive strength.

The adhesive tape of the present disclosure preferably has a higher tensile strength. The adhesive tape is required to have a sufficient strength when being pulled without distortion or removed for positional correction after being applied to an aluminum sash or a wall material. The adhesive tape preferably has a tensile strength of not less than 20 N/25 mm, more preferably not less than 30 N/25 mm, still more preferably not less than o0 N/25 mm. The upper limit of the tensile strength is typically 250N/25 mm. The double-sided adhesive tape can be imparted with a higher tensile strength by employing a tearable film having a tensile strength equal to or greater than that of the intended adhesive tape as the substrate film.

The adhesive tape of the present disclosure can be used in a wide variety of applications, for example, for packaging tapes such as craft tape, OPP tape, and fabric adhesive tape, light packaging adhesive cellophane tape, automotive foam tape, damping tape, flame-retardant adhesive tape, housing protection tape, soundproof seal, carpet fixing double-sided tape, electrically insulative vinyl tape, exterior corrosion-proof tape, interior bulletin board tape, slippage preventing tape, airtight waterproof adhesive tape, medical band aid and other patch base, surgical tape, adhesive bandage, electric/electronic device tape, optical double-sided tape, semiconductor device dicing tape, heat conductive tape, heat resistant tape, electrically conductive tape, and the like. Particularly, the adhesive tape of the present disclosure is very useful for the airtight waterproof adhesive tape.

The adherends to which the adhesive tape of the present disclosure is applied are not particularly limited. Where the adhesive tape of the present disclosure is applied as the airtight waterproof adhesive tape to an adherend, preferred examples of the adherend include housing structure and housing parts, and gaps between the housing parts. Particularly preferred examples of the adherend include higher polarity adherends such as aluminum sash, lower polarity adherends such as moisture-permeable waterproof sheet, and rough surface adherends such as OSB. In exemplary use applications of the airtight waterproof adhesive tape, the airtight waterproof adhesive tape is applied to a periphery of a window opening to attach a sash frame in the window opening, or to an outer periphery of the sash frame, thereby improving the airtightness and the heat insulation of the housing.

Further, the adhesive tape may be applied to a roofing polymer sheet material, for example, for airtight and waterproof sealing of a seam between sheets such as made of ethylene propylene diene rubber (EPDM), butyl rubber (IIR), chloroprene rubber (CR), polyvinyl chloride, chlorinated polyethylene, thermoplastic polyolefin rubber, and modified asphalt.

EXAMPLES

The embodiments of the present disclosure will hereinafter be described more specifically by way of examples thereof. It should be understood that the present disclosure be not limited to these examples within the scope of the present disclosure. In the following examples, "parts" and "%" are based on weight.

First, acrylic resins (A) were prepared in the following manner. The viscosity, the weight-average molecular weight, the dispersity ratio, and the glass transition temperature of each of the acrylic resins (A) were measured by the methods described above.

<Acrylic Resins (A)>

Prior to the preparation of the acrylic resins (A), the following compounds were prepared for the copolymerization formulation (a).

Component (a1)
  MA: Methyl acrylate
  MMA: Methyl methacrylate
  EA: Ethyl acrylate
  Vac: Vinyl acetate
  t-BA: Tertiary butyl acrylate
  ACMO: Acryloylmorpholine Component (a2-1)
  BA: Butyl acrylate Component (a2-2)
  2EHA: 2-Ethylhexyl acrylate Component (a3)
  CAO: Terminal carboxyl-containing monomer (hereinafter referred to as "CAO") represented by the following general formula (1):

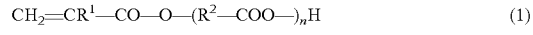

$$CH_2=CR^1—CO—O—(R^2—COO—)_nH \quad (1)$$

wherein $R^1$ is hydrogen, $R^2$ is an ethylene chain, and n is 1 to 5.

Component (a4)
  AAc: Acrylic acid

Component (a5)
  HEMA: 2-Hydroxyethyl methacrylate

SIPOMER-H available from Solvay Nicca, Ltd. was used as a mixture of the components (a3) and (a4).

SIPOMER-H contains 75% of CAO (a3) and 25% of acrylic acid (a4).

[Preparation of Acrylic Resin (A-1)]

First, 3 parts of methyl acrylate (a1), 26.7 parts of butyl acrylate (a2-1), 65.2 parts of 2-ethylhexyl acrylate (a2-2), 5 parts of SIPOMER-H (containing 3.75 parts of CAO (a3) and 1.25 parts of acrylic acid (a4)), 0.1 part of 2-hydroxyethyl methacrylate (a5), 55 parts of ethyl acetate, and 0.15 parts of azobisisobutyronitriie (as a polymerization initiator) were fed into a reaction vessel provided with a thermometer, a stirrer, and a reflux cooler. While the resulting mixture was heated with stirring, polymerization was allowed to proceed at an ethyl acetate reflux temperature for 7 hours. Then, the resulting reaction mixture was diluted with ethyl acetate. Thus, a 51% solution of an acrylic resin (A-1) was prepared.

The acrylic resin (A-1) thus prepared had a viscosity of 3,500 mPa·s/25° C. in a solution form, a weight-average molecular weight of 570,000, a dispersity ratio of 4.3, and a glass transition temperature of −60° C.

[Preparation of Acrylic Resins (A-2) to (A-14), and (A'-1) to (A'-3)]

Solutions of acrylic resins (A-2) to (A-14), and (A'-1) to (A'-3) were prepared in substantially the same manner as in the preparation of the acrylic resin (A-1), except that the formulation was changed as shown below in Tables 1 and 2. The viscosities, the weight-average molecular weights, the dispersity ratios, and the glass transition temperatures of the acrylic resins (A-1) to (A-14), and (A'-1) to (A'-3) are also shown below in Tables 1 and 2.

TABLE 1

| | | Preparation Examples | | | | | | | | |
|---|---|---|---|---|---|---|---|---|---|---|
| | | A-1 | A-2 | A-3 | A-4 | A-5 | A-6 | A-7 | A-8 | A-9 |
| | | Acrylic resin (A) | | | | | | | | |
| (a1) | Type | MA | MA | MMA | EA | MA | MA | MA | MA | MA |
| | (parts) | 3 | 12 | 6 | 6 | 6 | 6 | 6 | 6 | 6 |
| (a2) | BA (a2-1) (parts) | 26.7 | 24.1 | 25.8 | 25.8 | 23.8 | 0 | 9.4 | 63.4 | 25.8 |
| | 2EHA (a2-2) (parts) | 65.2 | 58.8 | 63.1 | 63.1 | 58.1 | 88.9 | 79.5 | 25.5 | 63.1 |
| CAO (a3) (parts) | | 3.75 | 3.75 | 3.75 | 3.75 | 9.0 | 3.75 | 3.75 | 3.75 | 1.25 |
| AAc (a4) (parts) | | 1.25 | 1.25 | 1.25 | 1.25 | 3.0 | 1.25 | 1.25 | 1.25 | 3.75 |
| HEMA (a5) (parts) | | 0.1 | 0.1 | 0.1 | 0.1 | 0.1 | 0.1 | 0.1 | 0.1 | 0.1 |
| Resin content (%) | | 51 | 51 | 52 | 50 | 51 | 51 | 53 | 51 | 51 |
| Visocisity (mPa · s/25° C.) | | 3,500 | 6,000 | 5,900 | 4,000 | 10,600 | 6,500 | 4,200 | 12,000 | 4,200 |
| Weight-average molecular weight | | 570,000 | 600,000 | 580,000 | 600,000 | 710,000 | 730,000 | 670,000 | 720,000 | 550,000 |
| Dispersity ratio | | 4.3 | 4.8 | 4.4 | 4.4 | 4.8 | 6.4 | 4.0 | 4.2 | 5.0 |
| Tg (° C.) | | −60 | −55 | −56 | −60 | −53 | −62 | −61 | −53 | −58 |

TABLE 2

| | | Preparation Examples | | | | | | | |
|---|---|---|---|---|---|---|---|---|---|
| | | A-10 | A-11 | A-12 | A-13 | A-14 | A'-1 | A'-2 | A'-3 |
| | | Acrylic resin (A) | | | | | | | |
| (a1) | Type | Vac | t-BA | ACMO | MA | MA | MA | — | MA |
| | (parts) | 6 | 6 | 6 | 6 | 6 | 6 | 0 | 6 |
| (a2) | BA (a2-1) (parts) | 25.8 | 25.8 | 25.8 | 25.8 | 25.8 | 25.8 | 27.5 | 27.3 |
| | 2EHA (a2-2) (parts) | 63.1 | 63.1 | 63.1 | 63.2 | 63.1 | 63.1 | 67.4 | 66.6 |
| | CAO (a3) (parts) | 3.75 | 3.75 | 3.75 | 3.75 | 3.75 | 0 | 3.75 | 0 |
| | AAc (a4) (parts) | 1.25 | 1.25 | 1.25 | 1.25 | 1.25 | 5.0 | 1.25 | 0 |
| | HEMA (a5) (parts) | 0.1 | 0.1 | 0.1 | 0 | 0.1 | 0.1 | 0.1 | 0.1 |
| | Resin content (%) | 49 | 51 | 52 | 50 | 50 | 58 | 50 | 51 |
| Visocisity (mPa · s/25° C.) | | 5,600 | 3,000 | 4,900 | 4,100 | 4,200 | 13,600 | 3,000 | 2,300 |
| Weight-average molecular weight | | 680,000 | 550,000 | 600,000 | 580,000 | 580,000 | 580,000 | 550,000 | 540,000 |
| Dispersity ratio | | 5.3 | 4.5 | 4.7 | 4.8 | 5.2 | 5.1 | 4.9 | 5.0 |
| Tg (° C.) | | −58 | −58 | −56 | −59 | −59 | −58 | −62 | −63 |

<Crosslinking Agent (B)>

The following compounds were prepared as the crosslinking agent (B).

Epoxy crosslinking agent: TETRAD-C (1,3-bis (N,N-diglycidylaminomethyl)cyclohexane) available from Mitsubishi Gas Chemical Co., Ltd.

Isocyanate crosslinking agent: CORONATE L-55E (an adduct of tolylene diisocyanate and trimethylolpropane (having a solid content of 55%) available from Tosoh Corporation <Tackifier>

The following compound was prepared as the tackifier.

Disproportionated rosin ester: SUPERESTER A-100 (a glycerin ester of disproportionated rosin having a softening point of 95° C. to 105° C.) available from Arakawa Chemical Industries, Ltd.

Examples 1 to 17 and Comparative Examples 1 to 3

In Examples 1 to 14 and Comparative Examples 1 to 3, 0.03 parts of the epoxy crosslinking agent (TETRAD-C) as the crosslinking agent (B) was mixed with 15 parts of the tackifier (C) and 100 parts (on a solid basis) of each of the acrylic resins (A-1) to (A-14) and (A'-1) to (A'-3) prepared in the aforementioned manners. In Examples 15 to 17, the isocyanate crosslinking agent (CORONATE L-55E) as the crosslinking agent (B) was mixed in a proportion (on a solid basis) shown below in Table 4 with 15 parts of the disproportionated rosin ester (SUPERESTER A-100) as the tackifier (C) and 100 parts (on a solid basis) of the acrylic resin (A-14). The resulting mixtures were each diluted with ethyl acetate to a solid concentration of 48%, and stirred to homogeneity. Thus, adhesive composition solutions were prepared.

Adhesive tapes were produced by a method to be described below by using the adhesive composition solutions thus prepared, and evaluated by methods to be described below. The evaluation results are shown below in Tables 3 and 4.

Examples 13 to 21 and Comparative Example 4

The epoxy crosslinking agent TETRAD-C or the isocyanate crosslinking agent CORONATE L-55E as the crosslinking agent (B) was mixed in a proportion (on a solid basis) shown below in Table 5 with 15 parts of the tackifier (C) and 100 parts (on a solid basis) of each of the acrylic resins (A-1), (A-14), and (A'-1) prepared in the aforementioned manners. The resulting mixtures were each diluted with ethyl acetate to a solid concentration of 48%, and stirred to homogeneity. Thus, adhesive composition solutions were prepared.

Adhesive tapes were produced by the method to be described below by using the adhesive composition solutions thus prepared, and evaluated by the methods to be described below. The evaluation results are shown below in Table 5.

Examples 22 and 23, and Comparative Example 5

The epoxy crosslinking agent TETRAD-C as the crosslinking agent (B) was mixed in a proportion (on a solid basis) shown below in Table 6 with 15 parts of the tackifier (C) and 100 parts (on a solid basis) of each of the acrylic resins (A-1), (A-14), and (A'-1) prepared in the aforementioned manners. The resulting mixtures were each diluted with ethyl acetate to a solid concentration of 48%, and stirred to homogeneity. Thus, adhesive composition solutions were prepared.

Adhesive tapes were produced by the method to be described below by using the adhesive composition solutions thus prepared, and evaluated by the methods to be described below. The evaluation results are shown below in Table 6.

[Production of Adhesive Tapes]

The adhesive composition solutions prepared in the aforementioned manners were each applied onto a flat yarn cloth (available from Diatex Co., Ltd. and having a thickness of 130 μm) by means of an applicator and dried at 90° C. for 3 minutes so as to form an adhesive composition layer having a dried thickness of 100 μm. Then, the adhesive composition layer was bonded to a release surface of a paper release liner (K-80H-S(F) available from Sun-A Kaken Co., Ltd.). Thereafter, the layer was thermally aged in a dryer at 40° C. for 7 days. Thus, adhesive tapes were produced.

<Adhesiveness Evaluation (1): 180-Degree Peel Strength>

A test strip having a width of 25 mm and a length of 150 mm was prepared by cutting each of the adhesive tapes of Examples 1 to 17 and Comparative Examples 1 to 3. A test plate of SUS304 steel (JIS-conforming test plate available from Engineering Test Service Co., Ltd.) and a test plate of polyethylene (PE) (standard test plate available from Nippon Testpanel Co., Ltd.) were each used as an adherend. After the paper release liner was removed from the test strip, the adhesive agent layer of the test strip was press-bonded to each of the test plates by moving a 2-kg roller at a press-bonding speed of 10 mm/s back and forth twice on the test plate. After the press-bonding, the resulting test strip was allowed to stand for 24 hours, and a 30-mm long free portion of the test strip was folded back 180 degrees and peeled off. Then, the test plate was fixed to a lower chuck, and an end of the test strip was fixed to an upper chuck. The adhesive strength was measured by peeling off the adhesive tape at a speed of 300 mm/minute at a peeling angle of 180 degrees from the adherend. The measurement results are shown below in Tables 3 and 4.

A test strip having a width of 25 mm and a length of 150 mm was prepared by cutting each of the adhesive tapes of Examples 18 to 21 and Comparative Example 4. A test plate of EPDM (standard test plate available from Nippon Testpanel Co., Ltd.) was used as an adherend. After the paper release liner was removed from the test strip, the adhesive agent layer of the test strip was press-bonded to the test plate by moving a 2-kg roller at a press-bonding speed of 10 mm/s back and forth twice on the test plate. After the press-bonding, the resulting test strip was allowed to stand for 30 minutes, and a 30-mm long free portion of the test strip was folded back 180 degrees and peeled off. Then, the test plate was fixed to a lower chuck, and an end of the test strip was fixed to an upper chuck. The adhesive strength was measured by peeling off the adhesive tape at a speed of 300 mm/minute at a peeling angle of 180 degrees from the adherend. The measurement results are shown below in Table 5.

A test strip having a width of 25 mm and a length of 150 mm was prepared by cutting each of the adhesive tapes of Examples 27 and 23 and Comparative Example 5. A test plate of CR (standard test plate available from Nippon Testpanel Co., Ltd.), a test plate of NR (standard test plate available from Nippon Testpanel Co., Ltd.), a test plate of SBR (standard test plate available from Nippon Testpanel Co., Ltd.), and a test plate of HR (standard test plate available from Nippon Testpanel Co., Ltd.) each having a surface cleaned with methanol and moisture-conditioned in a 23° C. and 50% RH atmosphere overnight were each used as an adherend. After the paper release liner was removed from the test strip, the adhesive layer of the test strip was press-bonded to each of the test plates by moving a 2-kg roller at a press-bonding speed of 10 mm/s back and forth twice on the test plate. After the press-bonding, the resulting test strip was allowed to stand for 30 minutes, and a 30-mm long free portion of the test strip was folded back 180 degrees and peeled off. Then, the test plate and a support plate for preventing the test plate from being bend were fixed to a lower chuck, and an end of the test strip was fixed to an upper chuck. The adhesive strength was measured by peeling off the adhesive tape at a speed of 300 ram/minute at a peeling angle of 180 degrees from the adherend. The measurement results are shown below in Table 6.

<Adhesiveness Evaluation (2): 90-Degree Peel Strength>

A test strip having a width of 25 mm and a length of 150 mm was prepared by cutting each of the adhesive tapes of Examples 1 to 17 and Comparative Examples 1 to 3. A test plate of commercially available TYVEK house wrap sheet and a test plate of OSB were each used as an adherend. After the paper release liner was removed from the test strip, the adhesive agent layer of the test strip was press-bonded to a surface of each of the test plates by moving a 2-kg roller (at a press-bonding speed of 10 mm/s) back and forth twice on the test plate. After the press-bonding, the resulting test strip was allowed to stand for 24 hours, and a 30-mm long free portion of the test strip was folded back 180 degrees and peeled off. Then, the test plate was fixed to a jig, and an end of the test strip was fixed to a tester. The adhesive strength was measured by peeling off the adhesive tape at a speed of 300 mm/minute at a peeling angle of 90 degrees from the adherend. The measurement results are shown below in Tables 3 and 4.

The TYVEK house wrap sheet is a commercially available TYVEK® house wrap, and the OSB is an oriented strand board which is a woody board produced by laminating thin wood plies with the use of an adhesive agent in properly oriented relation and compressing the resulting laminate at a higher, temperature and available from Ainsworth Lumber Co., Ltd. in Canada.

<Holding Force>

A test strip having a width of 25 mm and a length of 150 mm was prepared by cutting each of the adhesive tapes of Examples 3 to 17 and Comparative Examples 1 to 3. A test plate of SUS304 steel was used as an adherend. After the paper release liner was removed from the test strip, the adhesive agent layer of the test strip was press-bonded to the test plate so as to define a contact area having a size of 25 mm (width)×25 mm (length) by moving a 2-kg roller (at a press-bonding speed of 10 mm/s) back and forth twice on the test plate. An adhesive agent exposed portion of the test strip was folded back. After the press-bonding, the resulting test strip was allowed to stand in a 23° C. and 50% RH environment for 30 minutes, and then allowed to stand still in a 40° C. environment for 20 minutes. A 1-kg weight was attached to the test strip so that the test plate and the test strip were vertically suspended. Then, time required for the test strip to fall in the 40° C. environment, or a distance for which the test strip was displaced from the test plate after a lapse of 24 hours were measured. Where the test strip did not fall within 24 hours, the time was defined as 1440 (minutes). The measurement results are shown below in Tables 3 and 4.

A test strip having a width of 25 mm and a length of 75 mm was prepared by cutting each of the adhesive tapes of Examples 22 and 23 and Comparative Example 5. A test plate of EPDM (standard test plate EPDM-70 available from Engineering Test Service Co., Ltd.) having a surface cleaned with methanol and moisture-conditioned in a 23° C. and 50% RH atmosphere overnight was used as an adherend. After the paper release liner was removed from the test strip, the adhesive layer of the test strip was press-bonded to the test plate so as to define a contact area having a size of 25 mm (width)×25 mm (length) by moving a 2-kg roller at a press-bonding speed of 10 mm/s back and forth twice on the test plate. An adhesive agent exposed portion of the test strip was folded back. After the press-bonding, the resulting test strip was allowed to stand in a 23° C. and 50% RH environment for 30 minutes, and then allowed to stand still in a 40° C. environment for 20 minutes. A 1-kg weight was attached to the test strip so that the test plate and the test strip were vertically suspended. Then, time required for the test strip to fall in the 40° C. environment was measured. Where the test strip did not fall within 24 hours, the time was defined as 1440 (minutes). The measurement results are shown below in Table 6.

<Moist Heat Resistance>

A test strip having a width of 25 mm and a length of 150 mm was prepared by cutting each of the adhesive tapes of Examples 1 to 17 and Comparative Examples 1 to 3. A test plate of SUS304 steel was used as an adherend. After the paper release liner was removed from the test strip, the adhesive agent layer of the test strip was press-bonded to the test plate by moving a 2-kg roller at a press-bonding speed of 10 mm/s back and forth twice on the test plate. After the press-bonding, the resulting test strip was allowed to stand for 30 minutes, then exposed to a 60° C. and 90% RH environment for 7 days, and allowed to stand in a 23° C. and 50% RH environment for 1 hour. After a 30-mm long free portion of the test strip was folded back 180 degrees and peeled off, the test plate was fixed to a lower chuck, and an end of the test, strip was fixed to an upper chuck. The adhesive strength was measured by peeling off the adhesive tape at a speed of 300 mm/minute at a peeling angle of 180 degrees from the adherend. The measurement results are shown below in Tables 3 and 4.

TABLE 3

| | Example 1 | Example 2 | Example 3 | Example 4 | Example 5 | Example 6 | Example 7 | Example 8 | Example 9 | Example 10 |
|---|---|---|---|---|---|---|---|---|---|---|
| | Acrylic resin (A) | | | | | | | | | |
| Preparation Example | A-1 | A-2 | A-3 | A-4 | A-5 | A-6 | A-7 | A-8 | A-9 | A-10 |
| Solid content (%) | 100 | 100 | 100 | 100 | 100 | 100 | 100 | 100 | 100 | 100 |

TABLE 3-continued

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Crosslinking agent (B) | | | | | | | | | | |
| Type | Epoxy | Epoxy | Epoxy | Epoxy | Epoxy | Epoxy | Epoxy | Epoxy | Epoxy | Epoxy |
| Solid content (%) | 0.03 | 0.03 | 0.03 | 0.03 | 0.03 | 0.03 | 0.03 | 0.03 | 0.03 | 0.03 |
| Tackifier (C) | | | | | | | | | | |
| Solid content (%) | 15 | 15 | 15 | 15 | 15 | 15 | 15 | 15 | 15 | 15 |
| Adhesiveness Evaluation 180-degree peel strength (N/25 mm) | | | | | | | | | | |
| SUS | 33.1 | 44.0 | 44.0 | 34.4 | 31.1 | 33.3 | 35.0 | 39.4 | 40.5 | 39.7 |
| PE | 33.2 | 8.0 | 8.0 | 33.5 | 5.1 | 11.8 | 35.9 | 5.5 | 5.0 | 7.3 |
| 90-degree peel strength (N/25 mm) | | | | | | | | | | |
| TYVEK house wrap | 31.1 | 32.4 | 29.0 | 33.2 | 21.8 | 28.4 | 34.1 | 23.8 | 27.6 | 27.4 |
| OSB | 12.3 | 8.2 | 7.4 | 13.6 | 5.2 | 7.4 | 10.8 | 4.0 | 6.4 | 9.6 |
| Holding force With 1 kg at 40° C. | | | | | | | | | | |
| min. | 725 | 1333 | 1233 | 429 | 1440 | 538 | 444 | 1440 | 1322 | 1429 |
| mm | — | — | — | — | 0.1 | — | — | 0.5 | — | — |
| Moist heat resistance at 60° C. at 90% RH | | | | | | | | | | |
| After 7 days (N/25 mm) | 26.0 | 42.8 | 40.5 | 24.3 | 36.0 | 32.2 | 24.3 | 38.4 | 28.4 | 7.2 |

TABLE 4

|  | Example 11 | Example 12 | Example 13 | Example 14 | Example 15 | Example 16 | Example 17 | Comparative Example 1 | Comparative Example 2 | Comparative Example 3 |
|---|---|---|---|---|---|---|---|---|---|---|
| Acrylic resin (A) | | | | | | | | | | |
| Preparation Example | A-11 | A-12 | A-13 | A-14 | A-14 | A-14 | A-14 | A'-1 | A'-2 | A'-3 |
| Solid content (%) | 100 | 100 | 100 | 100 | 100 | 100 | 100 | 100 | 100 | 100 |
| Crosslinking agent (B) | | | | | | | | | | |
| Type | Epoxy | Epoxy | Epoxy | Epoxy | Isocyanate | Isocyanate | Isocyanate | Epoxy | Epoxy | Epoxy |
| Solid content (%) | 0.03 | 0.03 | 0.03 | 0.03 | 0.48 | 0.72 | 0.96 | 0.03 | 0.03 | 0.03 |
| Tackifier (C) | | | | | | | | | | |
| Solid content (%) | 15 | 15 | 15 | 15 | 15 | 15 | 15 | 15 | 15 | 15 |
| Adhesiveness Evaluation 180-degree peel strength (N/25 mm) | | | | | | | | | | |
| SUS | 34.9 | 32.9 | 39.4 | 43.0 | 40.4 | 36.9 | 31.7 | 29.2 | 29 | 5.7 |
| PE | 36.0 | 32.8 | 39.2 | 8.1 | 10.5 | 8.4 | 6.2 | 3.4 | 30.0 | 6.1 |
| 90-degree peel strength (N/25 mm) | | | | | | | | | | |
| TYVEK house wrap | 33.0 | 32.0 | 39.5 | 30.8 | 32.0 | 28.4 | 27.6 | 22.3 | 34.8 | 11.9 |
| OSB | 8.0 | 7.6 | 9.3 | 6.0 | 5.9 | 5.8 | 4.3 | 5.8 | 13.2 | 2.2 |
| Holding force With 1 kg at 40° C. | | | | | | | | | | |
| min. | 1124 | 902 | 923 | 753 | 1440 | 1440 | 1440 | 1440 | 108 | 0 |
| mm | — | — | — | — | 0.5 | 1.5 | 0.0 | 0.8 | — | — |
| Moist heat resistance at 60° C. at 90% RH | | | | | | | | | | |
| After 7 days (N/25 mm) | 26.5 | 26.6 | 30.1 | 29.3 | 38.9 | 33.5 | 27.4 | 33.5 | 21.9 | 5.9 |

TABLE 5

| | Example 18 | Example 19 | Example 20 | Example 21 | Comparative Example 4 |
|---|---|---|---|---|---|
| Acrylic resin (A) | | | | | |
| Preparation Example | A-1 | A-14 | A-1 | A-14 | A'-1 |
| Solid content (%) | 100 | 100 | 100 | 100 | 100 |
| Crosslinking agent (B) | | | | | |
| Type | Isocyanate | Isocyanate | Epoxy | Epoxy | Isocyanate |
| Solid content (%) | 0.7 | 0.46 | 0.035 | 0.024 | 0.7 |
| Tackifier (C) | | | | | |
| Solid content (%) | 15 | 15 | 15 | 15 | 15 |
| Adhesiveness Evaluation | | | | | |
| 180-degree peel strength (N/25 mm) after 30 minutes from press-bonding | | | | | |
| EPDM | 25.3 | 22.5 | 23.6 | 20.0 | 5.5 |

TABLE 6

| | Example 22 | Example 23 | Comparative Example 5 |
|---|---|---|---|
| Acrylic resin (A) | | | |
| Preparation Example | A-1 | A-14 | A'-1 |
| Solid content (%) | 100 | 100 | 100 |
| Crosslinking agent (B) | | | |
| Type | Epoxy | Epoxy | Epoxy |
| Solid content (%) | 0.04 | 0.024 | 0.028 |
| Tackifier (C) | | | |
| Solid content (%) | 15 | 15 | 15 |
| Adhesiveness Evaluation | | | |
| 180-degree peel strength (N/25 mm) after 30 minutes from press-bonding | | | |
| CR | 24.5 | 30.9 | 13.5 |
| NR | 23.8 | 29.5 | 13.2 |
| SBR | 19.8 | 26.4 | 7.5 |
| IIR | 23.5 | 30.1 | 7.1 |
| Holding force | | | |
| With 1 kg at 40° C. (min.) | | | |
| EPDM-70 | 157.5 | 373.5 | 1440 |

The results shown above in Tables 3 and 4 indicate that the adhesive tapes of Examples each firstly adhere to the higher polarity adherend (SUS), the lower polarity adherend (polyethylene), and the rough surface adherend (OSM), and have a higher holding force and excellent adhesiveness even in the high temperature and high humidity environment.

In contrast, the adhesive tape of Comparative Example 1 is inferior in adhesiveness to the higher polarity adherend (SUS), particularly to the lower polarity adherend (polyethylene). The adhesive tape of Comparative Example 2 is inferior in adhesive strength to the SUS adherend, and has a lower holding force and a lower moist heat resistance. Further, the adhesive tape of Comparative Example 3 is inferior in adhesiveness to the higher polarity adherend, the lower polarity adherend, and the rough surface adherend, and has a lower holding force.

The results shown above in Table 5 indicate that the adhesive tapes of Examples each firmly adhere to the EPDM.

In contrast, the adhesive tape of Comparative Example 4 is inferior in adhesiveness to the EPDM.

The results shown above in Table 6 indicate that the adhesive tapes of Examples each firmly adhere to the poor adhesion adherends (CR, NR, SBR, and IIR other than EPDM), and each have a practically satisfactory holding force to the EPDM.

In contrast, the adhesive tape of Comparative Example 5 is inferior in adhesiveness to the poor adhesion adherends other than the EPDM adherend.

While specific forms of the embodiments of the present disclosure have been shown in the aforementioned examples, the examples are merely illustrative of the disclosure but not limitative of the disclosure. It is contemplated that various modifications apparent to those skilled in the art could be made within the scope of the disclosure.

The adhesive composition of the present disclosure has higher adhesiveness to a higher polarity adherend, a lower polarity adherend, a poor adhesion adherend such as of ethylene propylene diene rubber (EPDM), and a rough surface, and is excellent in holding force and adhesiveness even in a high temperature/high humidity environment, and less susceptible to deterioration in adhesiveness over time. The adhesive composition of the present disclosure can be used in a wide variety of applications, for example, for packaging tapes such as craft tape, OPP tape, and fabric adhesive tape, light packaging adhesive cellophane tape, automotive foam tape, damping sheet, flame-retardant adhesive tape, housing protection tape, soundproof seal, carpet fixing double-sided tape, electrically insulative vinyl tape, exterior corrosion-proof tape, interior bulletin board tape, slippage preventing tape, airtight waterproof adhesive tape, medical band aid and other patch base, surgical tape, adhesive bandage, electric/electronic device tape, optical double-aided tape, semiconductor device dicing tape, heat conductive tape, heat resistant tape, electrically conductive tape, and the like. Particularly, the adhesive composition of the present disclosure is very useful for the airtight waterproof adhesive tape.

The invention claimed is:

1. An adhesive composition comprising an acrylic resin (A) obtained by copolymerizing a copolymerization formulation (a), the copolymerization formulation (a) comprising:
(a1) 1 to 20 wt. % of at least one selected from the group consisting of a (meth)acrylate having a C1 to C3 alkyl group and t-butyl (meth)acrylate;
(a2) 55 to 97 wt. % of a (meth)acrylate having a C4 to C24 alkyl group, other than t-butyl (meth)acrylate;

(a3) 1 to 20 wt. % of a terminal carboxyl-containing monomer represented by the following general formula (1):

$$CH_2=CO-O-(CH_2CH_2-COO-)_nH \quad (1)$$

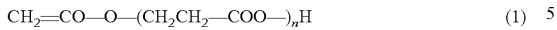

wherein R1 is hydrogen or a methyl group, and n is not less than 1; and (a4) 0.1 to 5 wt. % of (meth)acrylic acid.

2. The adhesive composition according to claim 1, wherein the (meth)acrylate (a2) having a C4 to C24 alkyl group comprises:
   (a2-1) a (meth)acrylate having a C4 to C7 alkyl group; and
   (a2-2) a (meth)acrylate having a C8 to C24 alkyl group.

3. The adhesive composition according to claim 2, wherein a weight-based ratio between a proportion of the (meth)acrylate (a2-1) having the C4 to C7 alkyl group and a proportion of the (meth)acrylate (a2-2) having the C8 to C24 alkyl group is (a2-1)/(a2-2)=1/99 to 85/15.

4. The adhesive composition according to claim 1, wherein a proportion of (meth)acrylic acid (a4) is 10 to 400 parts by weight based on 100 parts by weight of the terminal carboxyl-containing monomer (a3) represented by the general formula (1).

5. The adhesive composition according to claim 1, wherein the copolymerization formulation (a) further comprises:
   (a5) a hydroxyl-containing monomer.

6. An adhesive agent produced by crosslinking the adhesive composition according to claim 1.

7. An adhesive tape comprising:
   a substrate; and
   an adhesive agent layer provided on the substrate;
   wherein the adhesive agent layer comprises the adhesive agent according to claim 6.

8. An adhesive composition comprising an acrylic resin (A) obtained by copolymerizing a copolymerization formulation (a), the copolymerization formulation (a) comprising:
(a1) 1 to 20 wt. % of at least one selected from the group consisting of a (meth)acrylate having a C1 to C3 alkyl group, t-butyl (meth)acrylate, a cyclic structure containing monomer, and a C3 to C10 vinyl ester monomer;
(a2) 55 to 97 wt. % of a (meth)acrylate having a C4 to C24 alkyl group, other than t-butyl (meth)acrylate;
(a3) 1 to 20 wt. % of a terminal carboxyl-containing monomer represented by the following general formula (1):

$$CH_2=CO-O-(CH_2CH_2-COO-)_nH \quad (1)$$

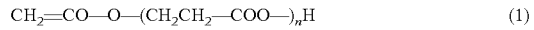

wherein $R^1$ is hydrogen or a methyl group, and n is not less than 1;
(a4) 0.1 to 5 wt. % of (meth)acrylic acid; and
(a5) a hydroxyl-containing monomer.

9. The adhesive composition according to claim 8, wherein the (meth)acrylate (a2) having a C4 to C24 alkyl group comprises:
   (a2-1) a (meth)acrylate having a C4 to C7 alkyl group; and
   (a2-2) a (meth)acrylate having a C8 to C24 alkyl group.

10. The adhesive composition according to claim 9, wherein a weight-based ratio between a proportion of the (meth)acrylate (a2-1) having the C4 to C7 alkyl group and a proportion of the (meth)acrylate (a2-2) having the C8 to C24 alkyl group is (a2-1)/(a2-2)=1/99 to 85/15.

11. The adhesive composition according to claim 8, wherein a proportion of (meth)acrylic acid (a4) is 10 to 400 parts by weight based on 100 parts by weight of the terminal carboxyl-containing monomer (a3) represented by the general formula (1).

12. An adhesive agent produced by crosslinking the adhesive composition according to claim 8.

13. An adhesive tape comprising:
   a substrate; and
   an adhesive agent layer provided on the substrate;
   wherein the adhesive agent layer comprises the adhesive agent according to claim 12.

* * * * *

UNITED STATES PATENT AND TRADEMARK OFFICE
CERTIFICATE OF CORRECTION

PATENT NO. : 11,286,323 B2
APPLICATION NO. : 16/565822
DATED : March 29, 2022
INVENTOR(S) : Ikebata et al.

Page 1 of 1

It is certified that error appears in the above-identified patent and that said Letters Patent is hereby corrected as shown below:

In the Claims

Column 29, Line 5 (Claim 1, Line 13) please change "$CH_2=CO-O-(CH_2CH_2-COO-)_nH$ --" to -- $CH_2=CR^1-CO-O-(CH_2CH_2-COO-)_nH$ --.

Column 30, Line 12 (Claim 8, Line 15) please change "$CH_2=CO-O-(CH_2CH_2-COO-)_nH$ --" to -- $CH_2=CR^1-CO-O-(CH_2CH_2-COO-)_nH$ --.

Signed and Sealed this
Twenty-eighth Day of June, 2022

Katherine Kelly Vidal
*Director of the United States Patent and Trademark Office*